Patented Apr. 27, 1926.

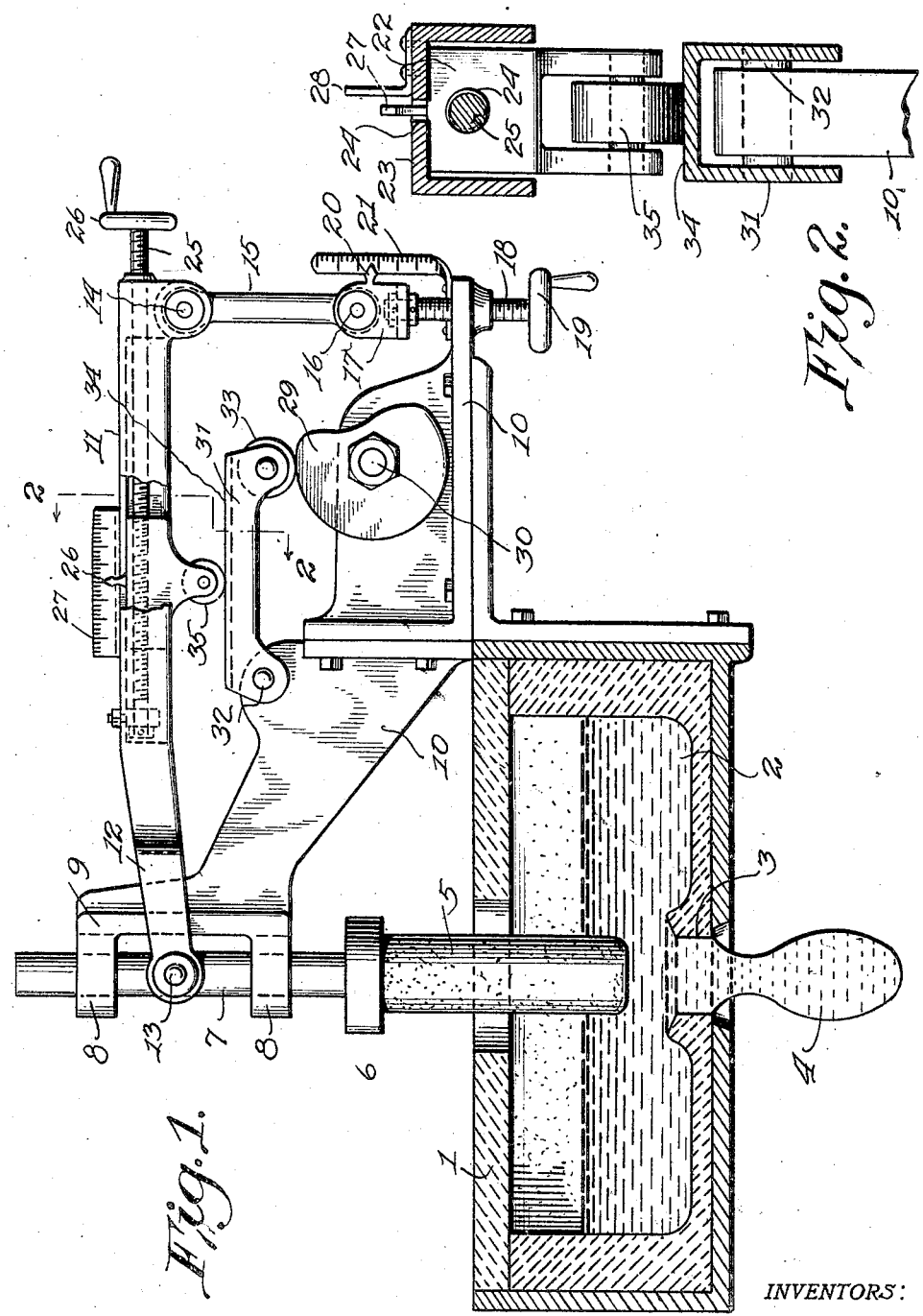

1,582,725

UNITED STATES PATENT OFFICE.

ALBERT R. BETHEL AND JOSIAH H. WILLIAMS, OF LOS ANGELES, CALIFORNIA.

GLASS FEEDER.

Application filed December 29, 1924. Serial No. 758,685.

*To all whom it may concern:*

Be it known that we, ALBERT R. BETHEL and JOSIAH H. WILLIAMS, citizens of the United States, residing at Los Angeles, in the county of Los Angeles and State of California, have invented new and useful Improvements in Glass Feeders, of which the following is a specification.

This invention relates to glass feeders for automatically delivering charges or gobs of molten glass from a furnace or discharge chamber to molds or other shaping devices. The primary object of the invention is to provide a feeder, embodying a reciprocating plunger and means for actuating the same, wherein the operation of the actuating means may be governed or controlled for regulating the feed motion of the plunger for the discharge of charges or gobs varying in size or quantity as may be desired or required in the shaping of different kinds of articles or different sizes of the same article.

A further object of the invention is to provide a plunger actuating mechanism including a lever for transmitting motion to the plunger and controllable means for varying the working action of the lever from a source of power, whereby the range of working motion of the plunger may be varied.

A still further object of the invention is to provide, in a working combination of the character set forth, means whereby the plunger actuating lever may be adjusted to set the feed plunger at a determined upper limit or starting point, from which its range of downward motion for a feed action may be governed or controlled.

With these and other objects in view, the invention consists of the features of construction, combination and arrangement of parts, hereinafter fully described and claimed, reference being had to the accompanying drawing, in which:—

Figure 1 is a sectional elevation showing the application of our improved feeder for use in connection with a discharge chamber.

Figure 2 is a detail section on an enlarged scale taken on the line 2—2 of Figure 1.

Referring now more particularly to the drawing, 1 designates a glass discharge chamber containing a charge of molten glass 2, which may be supplied thereto from any suitable source, and which is provided in its bottom with a discharge orifice 3, of a suitable form for the periodic discharge therethrough from the body of molten glass 2 of charges or gobs 4 at regular timed intervals by the action of a vertically reciprocating plunger 5.

The plunger 5 is shown, in the present instance, as movable through an opening in the top wall of the chamber 1 and is carried by a chuck or holder 6 on the lower end of a rod or stem 7 mounted to reciprocate in spaced guides 8 in a head 9 carried by a suitable support, generally indicated at 10. This plunger may be and preferably is made of refractory material and of proper diameter to be received at its lower end in the orifice 3 and to move downwardly thereinto to a greater or less extent for the expression from the mass of molten glass 2 of a charge or gob 4 on each downward working motion thereof.

The mechanism for reciprocating the plunger 5 comprises a plunger actuating lever 11 having a forked end 12 arranged to straddle the head 9 and pivotally connected with the rod or stem 7, as indicated at 13. The opposite end of this lever is fulcrumed, as at 14, upon the upper end of a link bar or rod 15, pivotally connected at its lower end, as at 16, to a bracket member or adjusting head 17 to which is swiveled a screw shaft 18 having a threaded engagement with the support 10 and provided with an operating hand wheel 19. The shaft 18 may be rotated in one direction or the other to raise or lower the bracket 17 and correspondingly raise or lower the pivot point 14 of the fulcrumed end of the lever 11, whereby the working elevation of the lever may be varied to vary the upper limit or starting point of the plunger 5 with relation to the orifice 3, as will be readily understood. A pointer 20 is provided upon the bracket 17 for cooperation with a fixed scale member 21 on the support 10 whereby the degree of upward or downward adjustment of the support 10 and fulcrum point of the lever 11 may be determined.

The body portion of the lever 11 is channeled or recessed to receive a block or carriage 22, which is movable longitudinally in the channel or recess, the latter being open at its underside and closed at its top by a wall 23, said wall having a guide slot 24 therein of a length corresponding to the length of travel of the block or carriage 22. This block or carriage is provided with a threaded opening 24 through which passes a longitudinally extending screw shaft 25 suitably journaled at its ends upon the lever and extending at its rear end beyond the fulcrumed end of the lever and provided with a hand wheel 26 whereby it may be turned in one direction or the other to shift the block or carriage 22 forwardly or rearwardly. The block or carriage 22 may carry a pointer 27 projecting through and movable in the slot 24 with relation to a fixed scale plate 28 on the lever 11 whereby the block or carriage may be adjusted with accuracy to any determined working point.

A cam or eccentric 29 carried by a shaft 30, journaled on the support 10, is provided for transmitting intermittent up and down vibratory or oscillatory movements to the actuating lever 11, through the medium of an interposed motion transmitting lever 31 for the purpose of reciprocating the plunger 5 at properly timed intervals. As shown the lever 31 is pivotally mounted at one end upon the support 10, as indicated at 32, so as to be free to vibrate or oscillate in a vertical plane, said lever being disposed between the cam 29 and the body portion of the lever 11 and provided at its free end with a roller 33 arranged to rest and travel upon the periphery of the cam 29. The upper surface of the lever 31 is formed to provide a support or trackway 34 on which rests a contact point or roller 35 on the block or carriage 22, whereby, through sliding adjustments of said block or carriage 22, the point of contact of the roller 35 with the surface 24 between the pivoted and cam engaging ends of the lever 31 may be varied. The cam 29 may be driven continuously in one direction at any predetermined speed by any suitable type of driving means, as, for example, chain and sprocket gearing from a motor, no driving means being shown as the same is unessential to a proper disclosure of my invention. The periphery of the cam 29 is suitably formed or shaped to provide high and low points upon which the roller 33 travels in succession on each revolution of the cam, whereby the lever 31 at proper intervals and at proper time periods is raised to raise the lever 11 and then permitted to drop by gravity to also allow the lever 11 to drop by gravity, so as to successively effect the upward movement of the plunger 5, to secure a desired dwell at its limit of upward movement, and to permit it to have a predetermined period of downward movement on its working action for the discharge of a charge of molten glass through the orifice 3.

At all times when the plunger 5 is elevated above the orifice 3, molten glass may flow from the body of glass 2 in the chamber 1 downward through the orifice 3 by gravity, the amount and size or volume of the glass discharging to form the charge depending upon the elevation and time period and range of downward movement of the plunger 5. The plunger 5 at the limit of its downward stroke enters the opening 3 and cuts off the flow of glass, thus ensuring a cut off action at a predetermined time after the start of flow, whereby a charge or gob 4 of a measured size or quantity will be expelled for discharge into the mold or other shaping device. Upon the closure of the orifice 3 by the plunger 5, and the stoppage in the flow of glass, the sagging of the expelled charge causes an elongation and narrowing of its upper portion to form a neck, along which the body of the glob is separated by any suitable type of severing means from a portion of the glass which may remain in a part of the opening 3, which aftermath or residual glass is drawn upwardly into the body of molten glass 2 in the chamber by the suction of the plunger 5 on its succeeding upward motion. As the plunger 5 travels upward, and during the time period consumed in its upward travel and subsequent downward travel, through its actuation by the cam mechanism, glass flows outwardly through the orifice 3 for the formation of the succeeding charge or gob, which is separated from the body of glass and discharged on the following downward movement of the plunger, as will be readily understood. By varying the uppermost limit of travel of the plunger so as to vary its starting point, through the adjustment of the screw shaft 18, the time period of up and down travel of the plunger 5 may be regulated to vary the amount of glass flowing outwardly through the orifice 3 on each working action for the formation of a charge or gob of any predetermined size or volume. Also by varying the point of contact of the roller 35 with the lever 31, by adjustment of the block or carriage 22 through the medium of the screw shaft 25, the point of applied power of the lever 31 on the lever 11 will be varied, through a variation in the position of the intermediate fulcrum point 35 of the lever 11 with respect to the free end of the lever 31 provided with the roller 33, whereby the range of motion of the forked end 12 of the lever 11 is lengthened or shortened, thereby varying the throw or stroke, i. e., length of travel of the plunger 5 with respect to the orifice 3.

By thus varying the length of travel of the plunger 5 with respect to the orifice 3 from any predetermined upper limit or starting point to which the plunger 5 is set, the working action of the plunger may be governed so as to vary its downward limit of movement, so that the plunger may be given any working range of travel dependent upon its initial starting position to vary the time limits of flow and cut off of the glass for the further regular discharge of glass for a wider range of control in supplying glass charges varying to large degrees in size and volume. By thus varying the throw or stroke as well as the working elevation of the lever 11, our invention provides a means for securing a wide range of variable feed action of the plunger for supplying charges or gobs of glass varying widely in size or volume for manifold purposes in the production of articles of different sizes and also in the production of different sizes of articles of the same kind. Within the scope of our invention, however, the fulcrum point 14 of the lever may be either adjustable, as shown, or fixed, in which latter event a desirable range of working motions of the plunger may still be secured for many and various purposes through the variable throw action of the lever 11 afforded by the adjustable motion transmitting mechanism.

It will, of course, be understood that the size of the orifice 3 and plunger 5 and shape, proportions and construction and relative arrangement of the parts of the apparatus may be varied as desired within the scope of the appended claims, without departing from the spirit or sacrificing any of the advantages of the invention.

Having thus fully described our invention, we claim:—

1. In a feeder, a discharge chamber having a discharge orifice, a reciprocatory plunger movable with relation to said orifice, a lever for actuating the plunger, said lever having a fulcrum point and a point of connection with the plunger, and motion transmitting means for vibrating the lever, said means being operative on the lever at a point between its fulcrum point and its point of connection with the plunger and comprising a cam, a motion transmitting lever vibrated by the cam, and a contact on the plunger actuating lever engageable with said motion transmitting lever for transmitting vibratory motion from the latter to the former, said contact being adjustable with relation to both levers.

2. In a feeder, a discharge chamber having a discharge orifice, a vibratory lever, a reciprocatory plunger actuated by the lever and movable with relation to said orifice, a cam, a motion transmitting lever vibrated by the cam, a contact on the plunger actuating lever engageable with and adjustable longitudinally of the motion transmitting lever, and means for adjusting said contact longitudinally of the plunger actuating lever.

3. In a feeder, a discharge chamber having a discharge orifice, a vibratory lever fulcrumed at one end, a reciprocatory plunger coupled to the other end of the lever and movable with relation to said orifice, and motion applying means acting on the lever between its ends, said means being adjustable to vary the throw of the lever.

4. In a feeder, a discharge chamber having a discharge orifice, a vibratory lever fulcrumed at one end, a reciprocatory plunger coupled to the opposite end of the lever for movement toward and from said orifice, motion transmitting means acting on the lever between its ends, and means for adjusting said motion transmitting means for varying the throw of the lever under the action of said motion transmitting means.

5. In a feeder, a discharge chamber having a discharge orifice, a reciprocatory plunger movable with relation to said orifice, a lever for actuating the plunger, said lever having a fulcrum point and a point of connection with the plunger, means for varying the elevation of the fulcrum point of the lever, and motion transmitting means for vibrating the lever, said means being operative on the lever at a point between its fulcrum point and its point of connection with the plunger and comprising a cam, a vibratory motion transmitting lever actuated by the cam, a contact on the plunger actuating lever engaging said motion transmitting lever, and means on said plunger actuating lever for adjusting said contact with relation to both levers.

6. In a feeder, a discharge chamber having a discharge orifice, a vibratory lever fulcrumed at one end, means for varying the elevation of the fulcrum point of the lever, a reciprocatory plunger coupled to the other end of the lever and movable with relation to said orifice, and motion applying means acting on the lever between its ends, said means being adjustable to vary the throw of the lever.

7. In a feeder, a discharge chamber having a discharge orifice, a vibratory lever fulcrumed at one end, means for varying the elevation of the fulcrum point of the lever, a reciprocatory plunger coupled to the opposite end of the lever for movement toward and from said orifice, motion transmitting means acting on the lever between its ends, and means for varying the throw of the lever under the action of said motion transmitting means.

8. In a feeder, a discharge chamber having a discharge orifice, a reciprocatory plunger movable with relation to the orifice, a vibratory plunger actuating lever fulcrumed at one end and coupled to the plunger at its opposite end, a cam, a vibratory motion transmitting member actuated by the cam, and a working connection between said lever and motion transmitting member arranged at a point between the ends of the lever and adjustable to vary the throw of the lever under fixed working motions of said motion transmitting member.

9. In a glass feeder, a discharge chamber having a discharge orifice, a reciprocatory plunger movable with relation thereto, a vibratory lever fulcrumed at one end and coupled at its opposite end to the plunger, and means acting on the lever at a point between its ends for transmitting vibratory motion to said lever, said means being operatively adjustable for varying the working motion of the lever and the stroke of the plunger.

10. In a glass feeder, a discharge chamber having a discharge orifice, a reciprocatory plunger movable with relation to said orifice, a vibratory lever for actuating the plunger, a cam, a vibratory motion transmitting lever operated by the cam, and a working connection between said motion transmitting lever and the actuating lever adjustable with relation to said levers for varying the throw of the actuating lever.

11. In a glass feeder, a glass discharge chamber having a glass discharge orifice, a reciprocatory plunger movable with relation thereto, a vibratory actuating lever fulcrumed at one end and coupled at its opposite end to the plunger, a rotary cam, a motion transmitting lever arranged to be vibrated by said cam, a contact device on the actuating lever, and means for shifting said contact device longitudinally of the actuating lever and for engagement with the motion transmitting lever at different points in the length thereof.

12. In a glass feeder, a glass discharge chamber having a discharge orifice, a reciprocatory plunger movable with relation to said orifice, a vibratory plunger actuating lever, a cam, a vibratory motion transmitting lever operated by the cam, and a contact device mounted on and adjustable longitudinally of said plunger actuating lever and in adjustable contact with a surface of said motion transmitting lever.

13. In a glass feeder, a glass discharge chamber having a discharge orifice, a reciprocatory plunger movable with relation to said orifice, a vibratory plunger actuating lever, a cam, a motion transmitting lever pivotally supported at one end and having a free end in engagement with the acting surface of the cam, said lever having a longitudinally extending contact surface, and a contact carried by and adjustable longitudinally of the plunger actuating lever and adjustably engageable with said contact surface of said motion transmitting lever.

14. In a glass feeder, a glass discharge chamber having a discharge orifice, a reciprocatory plunger movable with relation to said orifice, a vibratory plunger actuating lever, a cam, a vibratory motion transmitting lever operated by the cam and provided with a longitudinally extending contact surface, a slidably mounted member on the plunger actuating lever adjustable longitudinally thereof and having a contact surface adjustably engageable with the contact surface of the motion transmitting lever, and an adjusting screw for slidably adjusting said member.

15. In a glass feeder, a glass discharge chamber having a discharge orifice, a reciprocatory plunger movable with relation to said orifice, a vibratory plunger actuating lever fulcrumed at one end and pivotally coupled to the plunger at its opposite end, a cam, a vibratory motion transmitting lever pivoted at one end and having a contact surface at its opposite end engaging the cam, and a member carried by and adjustable longitudinally on the plunger actuating lever between its ends, said member having a contact surface adjustably engageable with the motion transmitting lever lengthwise thereof.

16. In a glass feeder, a glass discharge chamber having a discharge orifice, a reciprocatory plunger movable with relation to said orifice, a vibratory plunger actuating lever fulcrumed at one end and pivotally coupled to the plunger at its opposite end, a cam, and motion transmitting means actuated by the cam and operating upon the plunger actuating lever between its ends, said mechanism comprising a pair of non-connected but engaging motion transmitting members between the cam and plunger actuating lever, said members being adjustable with relation to each other and to the plunger actuating lever for varying the range of motion of said plunger actuating lever and the stroke of the plunger.

17. In a glass feeder, a glass discharge chamber having a discharge orifice, a reciprocatory plunger movable with relation to said orifice, a vibratory plunger actuating lever fulcrumed at one end and pivotally coupled to the plunger at its opposite end, a cam, and motion transmitting mechanism between the cam and the lever acting on the latter between its ends, said mechanism comprising a member vibrated by the cam and a member for transmitting vibratory motion from said vibratory member to the vibratory plunger actuating lever, said members being adjustable relatively to each other and to said lever for varying the vibratory motion of the latter and the stroke of the plunger.

In testimony whereof we affix our signatures.

ALBERT R. BETHEL.
JOSIAH H. WILLIAMS.